Patented Dec. 7, 1937

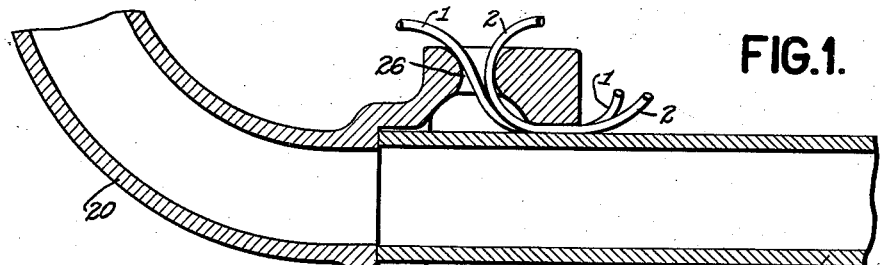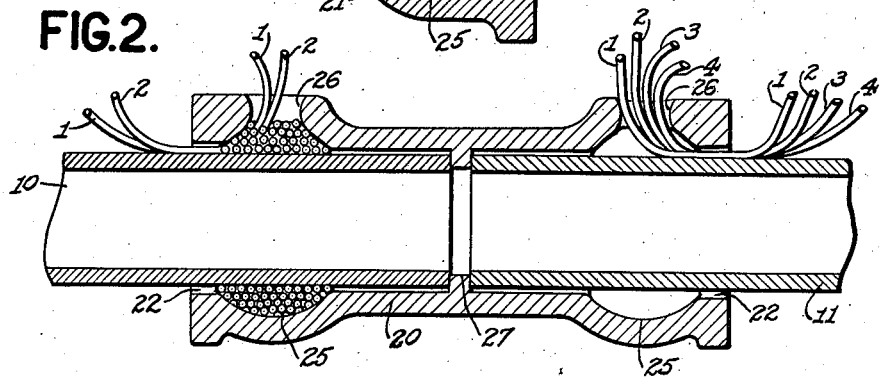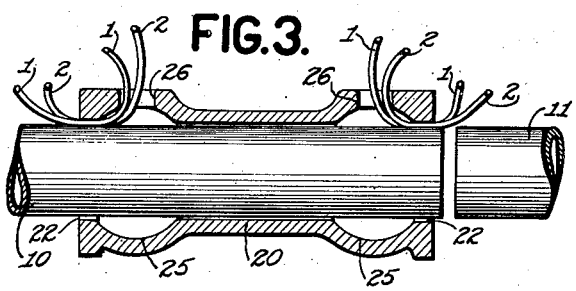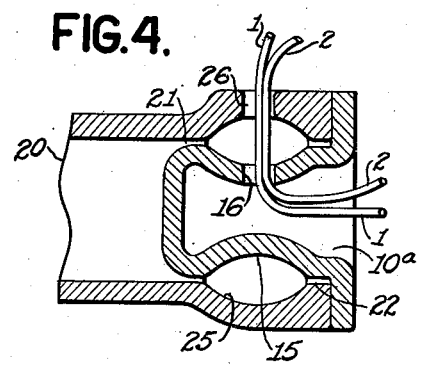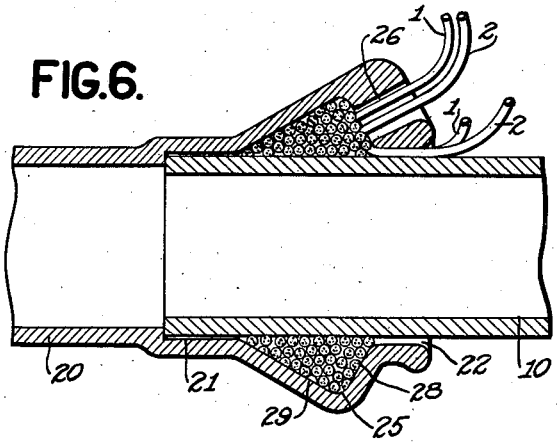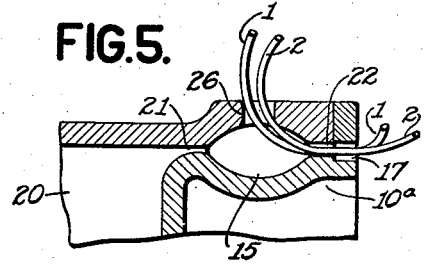

2,101,155

UNITED STATES PATENT OFFICE 2,101,155

PIPE JOINT

Alden E. Osborn, New York, N. Y.

Application October 5, 1936, Serial No. 104,011

7 Claims. (Cl. 285—163)

My invention relates to a pipe joint, or means for attaching fittings or couplings to pipe or other objects, which will not only firmly retain the parts to be connected in position, but also forms a leak proof joint capable of withstanding considerable pressure. This joining means is very inexpensive, as threads, bolts, etc., are eliminated, and can be adapted to a large variety of conditions and uses without departure from the spirit and scope of the invention as defined in the appended claims.

In the accompanying drawing—

Figure 1 represents a longitudinal sectional view of my invention applied between a pipe and fitting.

Figure 2 represents a longitudinal sectional view of my invention applied to a coupling for connecting two pipes.

Figure 3 represents a longitudinal sectional view of the joining means of Figs. 1 and 2 in a modified coupling permitting a different method of assembling the device.

Figure 4 represents a longitudinal sectional view of my invention applied to a joint between a fitting or other article and a cover therefor.

Figure 5 represents a longitudinal part sectional view of a modification of Figure 4, and Figure 6 represents a longitudinal sectional view of a modification of my invention as illustrated in Figures 1, 2, 3, 4 and 5 shown applied to a fitting similar to that of Figure 1.

In Figure 1 my invention is arranged to fasten, with a leak-proof joint, the pipe or tube 10 into the fitting 20. This fitting 20 is provided with a socket which at 21 fits the pipe 10 with relatively little clearance while at 22 it has considerable clearance. Between these two different diameter parts the fitting is provided with a circumferential channel 25 and with an aperture 26 which perforates the wall of the fitting and opens into the channel. There is also provided, in order to complete my invention, a wire or cord 1 of metal or any other relatively hard and strong material and a second wire or cord 2 of a soft metal or a relatively soft material suitable for packing purposes.

The method of assembling this joint is as follows:—The ends of the wires 1 and 2 are passed thru the aperture 26 of the fitting 20 and out of the enlarged opening 22 of the socket therein and the pipe 10 is thereafter put in position within the socket with the wires 1 and 2 extending thru the clearance between the pipe and enlarged part 22 of the socket opening. The pipe 10 (or fitting 20 if it is more convenient) is then turned with the ends of the wires 1 and 2 that extend beyond the clearance held from movement relative to the pipe with the result that the part of both the wires 1 and 2 that extends outside of the aperture 26 will be simultaneously pulled thru the aperture and wound about the pipe 10 until the channel 25 is filled to the extent desired to produce a tight joint and retain the pipe in position. Owing to the fact that the wire 1 (which functions as a retaining means) is of relatively strong material it is easily possible to obtain a very high pressure on the exterior of the pipe before the strain of pulling the wire thru the aperture is sufficient to break the same and, in some cases, an actual groove will be formed in the pipe 10 before the wire 1 breaks, thus holding the pipe very securely.

At the same time the wire 2 (which functions as a packing) is compressed with a very high pressure and, while it may break before the desired amount of wire 1 is in position, that part of the wire 2 that is already in the channel 25 would be subject to so much pressure that it would be caused to fill all points where leakage might take place and thus forms a very tight joint. It will be noticed that the object of the clearance at 22 in the pipe socket of the fitting 20 is to enable the ends of the wires 1 and 2 to pass outside the fitting adjacent to the pipe 10 so that the ends can be held from movement in relation to the pipe during the first turns of the pipe or fitting in the process of winding the wires into the socket and that this feature is in accordance with and serves the same purpose as the construction described and claimed in my patent for a Protector, No. 1,949,431 of March 6, 1934, and will not herein be further dealt with.

In Figure 2 is shown the joint illustrated in Figure 1 and just described applied to a coupling for joining pipe. In this figure my pipe joints are at each end of the coupling 20 and one of them is shown as having the two wires 1 and 2 wound in position while the other is shown with four wires 1, 2, 3 and 4 passed thru the aperture 26 and clearance at 22. The joint last to be tightened would preferably be made up by turning the pipe entering this joint after the coupling has been applied to the other pipe by rotating the coupling, however, in some cases, both joints between the coupling and pipes can be tightened simultaneously by rotating the coupling with both pipes stationary provided the proportions of the parts and wires are such that approximately equal pressures can be obtained in both joints when the tightening is completed. A modification of this coupling design is illustrated in Figure 3 in which figure the coupling is shown in the course of its application to the ends of the two pipes 10 and 11. In the coupling of this figure the centralizing flange 27 of Figure 2 is eliminated thus permitting the coupling to be pushed entirely over the end of one of the pipes when the pipe line is being assembled and later moved to encompass the ends of both pipes before the wires are tightened. This arrangement has advantages in some cases.

In Figure 4 is shown another application of my invention in that the fitting 20 may be the rim of an inspection opening of a tank or boiler or the end of a bottle, barrel, drum or container around the opening thereof while instead of the pipe 10 a plug or cover 10a is arranged to be held in this opening of the fitting or equivalent part. Owing to the fact that this plug 10a can, unlike the pipe 10 of the preceding figures, be especially formed, it is, therefore, shown as provided with a channel 15 and also with an aperture 16 intersecting the channel whereby the ends of the retaining wire 1 and the packing wire 2 can be passed thru this aperture 16 and reached and held immovable in relation to the plug 10a while the wires are being wound into position. It will be noticed that the clearance at 22 of the preceding figures is rendered unnecessary and that the socket for the plug can, except for the channel, be of uniform diameter. This arrangement of my invention is, in certain of its features, related to and claimed in my co-pending application for a Means for attaching members to the interior of hollow articles, Serial No. 741,061 filed August 23, 1934, now Patent No. 2,070,296 of February 9, 1937. A small modification of the arrangement of my invention shown in Figure 4 is, however, shown in Figure 5 in which a clearance is provided at 22 for the wires 1 and 2 to pass thru, so that they can be held, and, therefore, this particular design is, in this respect, similar to the device of my aforementioned Patent No. 1,949,431. The ends of the wires 1 and 2 are, after being passed thru the clearance, shown as being passed thru a hole 17 of the flange of the plug so that the flange can bear against the fitting 20.

In Figure 6 is shown a modification of my pipe joint as shown in the previously described figures which modification is illustrated in combination with the Figure 1 type of fitting although it can be applied to any use and used in any way to which the preceding forms of my invention can be adapted. In this modification the channel 25 is changed in form and the aperture 26 intersects the channel thru its wall 28 towards the outer end of the fitting 20. The inner wall 29 of the channel is preferably arranged at a very small angle to the outside of the pipe 10 so that, as the wires 1 and 2 are wound into the channel thru the aperture 26, they would be pressed longitudinally into this tapered portion of the channel with a wedge effect thus exerting a greater pressure on the outside of the pipe than would be obtained by the final winding of the wires 1 and 2 against the walls of the channel as occurs in the preceding forms of my invention. This modification also has the advantage of having the aperture at a point distant from the inner end of the pipe about which leakage must take place and there is, therefore, more resistance to leakage taking place thru the aperture.

In the foregoing description and appended claims each of the elements referred to as a wire can be stranded or composed of a number of separate wires twisted or braided together, or it may be a single homogeneous wire of such material and size that it can be readily bent in passing thru the aperture and winding about the pipe or internal member.

Having thus described my invention, I claim as new and desire to secure by Letters Patent:—

1. A fitting having a channel and provided with an aperture intersecting said channel, and a means for retaining a member within said fitting and for preventing leakage adjacent said means of retention, comprising a wire of relatively hard material and a second wire of relatively soft material, both said wires being adapted to be simultaneously wound thru said aperture and into said channel by relative rotation between said fitting and said member.

2. A fitting having a channel and provided with an aperture intersecting said channel, and a means for retaining a member within said fitting and for preventing leakage adjacent said means of retention, comprising a plurality of wires—some of said wires being composed of materials having substantially different characteristics from other of said wires and all said wires being adapted to be simultaneously wound thru said aperture and into said channel by relative rotation between said fitting and said member.

3. A means for forming a joint between an open ended member having a circumferential channel within said open end and an aperture thru its wall and intersecting said channel, and a second member having a cylindrical portion extending into said open end of said open ended member beyond the said channel, comprising a wire of relatively hard, strong material, in said channel and extending into said aperture, and a second wire of relatively soft plastic material also in said channel and extending into said aperture, both of said wires surrounding said cylindrical portion of said second mentioned member.

4. A joint comprising a member having a cylindrical portion, an open-ended member into which said cylindrical portion of said first mentioned member extends and having a circumferential channel within said open end surrounding the said cylindrical portion of said first mentioned member whereby said channel forms an enlarged space around the said cylindrical portion with integral parts of said open ended member fitting more closely about said cylindrical portion at each side of said channel, and a wire in said channel for retaining said first mentioned member in position in said open end of said second mentioned member, and a second wire, also in said channel, for preventing leakage thru the joint, both of said last mentioned wires filling said channel, with said leakage preventing wire being compressed by said retaining wire and with said retaining wire also pressing against said first mentioned member and said open ended member.

5. A joint comprising a member having a cylindrical portion, an open ended member into which said cylindrical portion of said first mentioned member extends and having a circumferential channel within said open end surrounding the said cylindrical portion of said first mentioned member whereby said channel forms an enlarged space around the said cylindrical portion with integral parts of said open ended member fitting more closely about said cylindrical portion at each side of said channel, and a wire in said channel and encircling said first mentioned member, for retaining said first mentioned member in position in said open end of said second mentioned member, and a second wire, also in said channel and encircling said first mentioned member, for preventing leakage thru the joint, and means whereby said retaining wire presses against said leakage preventing wire, said first mentioned member and said open ended member, said means being operable by relative rotation between the members.

6. A means for forming a joint between an open-ended member having a circumferential channel within said open end and an aperture thru its wall and intersecting said channel, and a second member having a cylindrical portion extending into said open end of said open-ended member beyond the said channel, comprising a wire of relatively hard, strong material in said channel and a second wire of relatively soft, plastic material also in said channel, both of said wires being wound into said channel thru said aperture by relative rotation between said open-ended member and said second mentioned member, and means to increase the pressure on said soft, plastic wire and on said open-ended member and said second mentioned member, comprising continuing to wind said hard, strong wire into said channel after said soft, plastic wire breaks.

7. A means for forming a joint between an open-ended member having a circumferential channel within said open end and an aperture thru an outer wall thereof and intersecting said channel, and a second member having a cylindrical portion extending into said open end of said open-ended member beyond the said channel, comprising a wire of relatively hard, strong material in said channel and a second wire of relatively soft, plastic material also in said channel, both of said wires being wound into said channel thru said aperture by relative rotation between said open-ended member and said second mentioned member, and means to exert a longitudinal pressure on said soft, plastic wire to wedge said soft, plastic wire between an inner wall of said channel and said second mentioned member and to also exert a direct pressure against said open-ended member and said second mentioned member, comprising continuing to wind said hard, strong wire into said channel thru the said end wall aperture thereof after said soft, plastic wire breaks.

ALDEN E. OSBORN.